May 22, 1951  R. TUCK ET AL  2,553,689
OVERLOADING STABILIZER
Filed Nov. 3, 1947  2 Sheets-Sheet 1
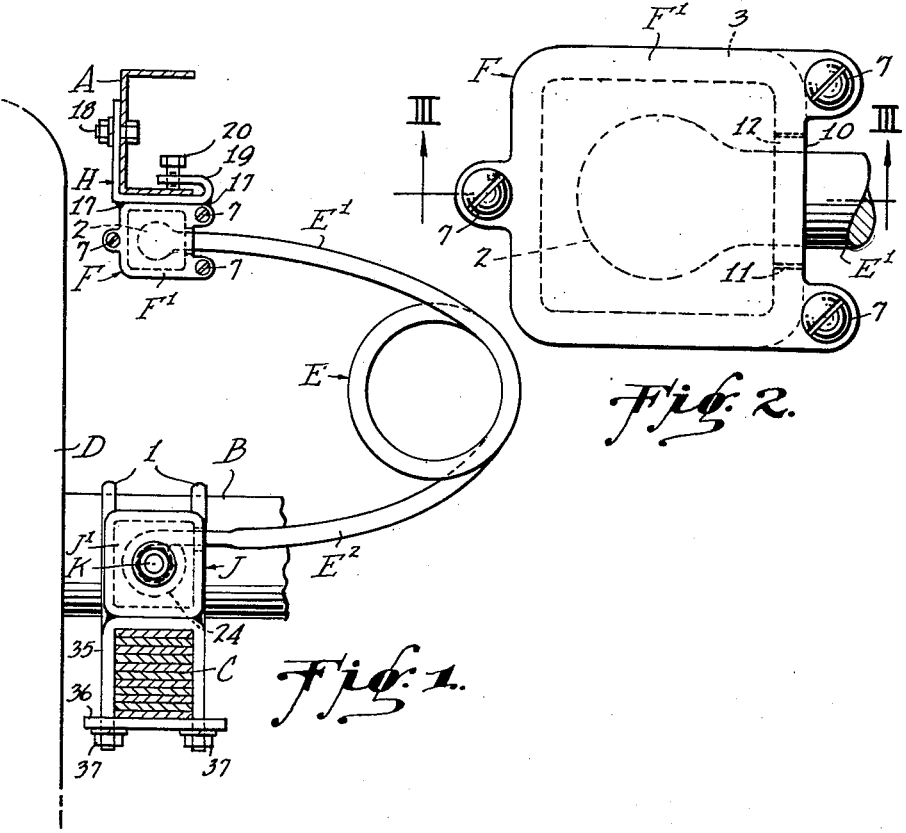
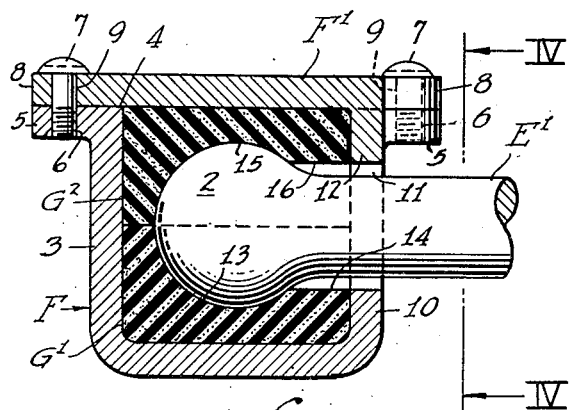
INVENTORS
RALPH TUCK
THOMAS E. HUGHES
ARTHUR U. RIGBY
BY Munn, Liddy & Glaccum
ATTORNEYS May 22, 1951 R. TUCK ET AL 2,553,689
OVERLOADING STABILIZER
Filed Nov. 3, 1947 2 Sheets-Sheet 2
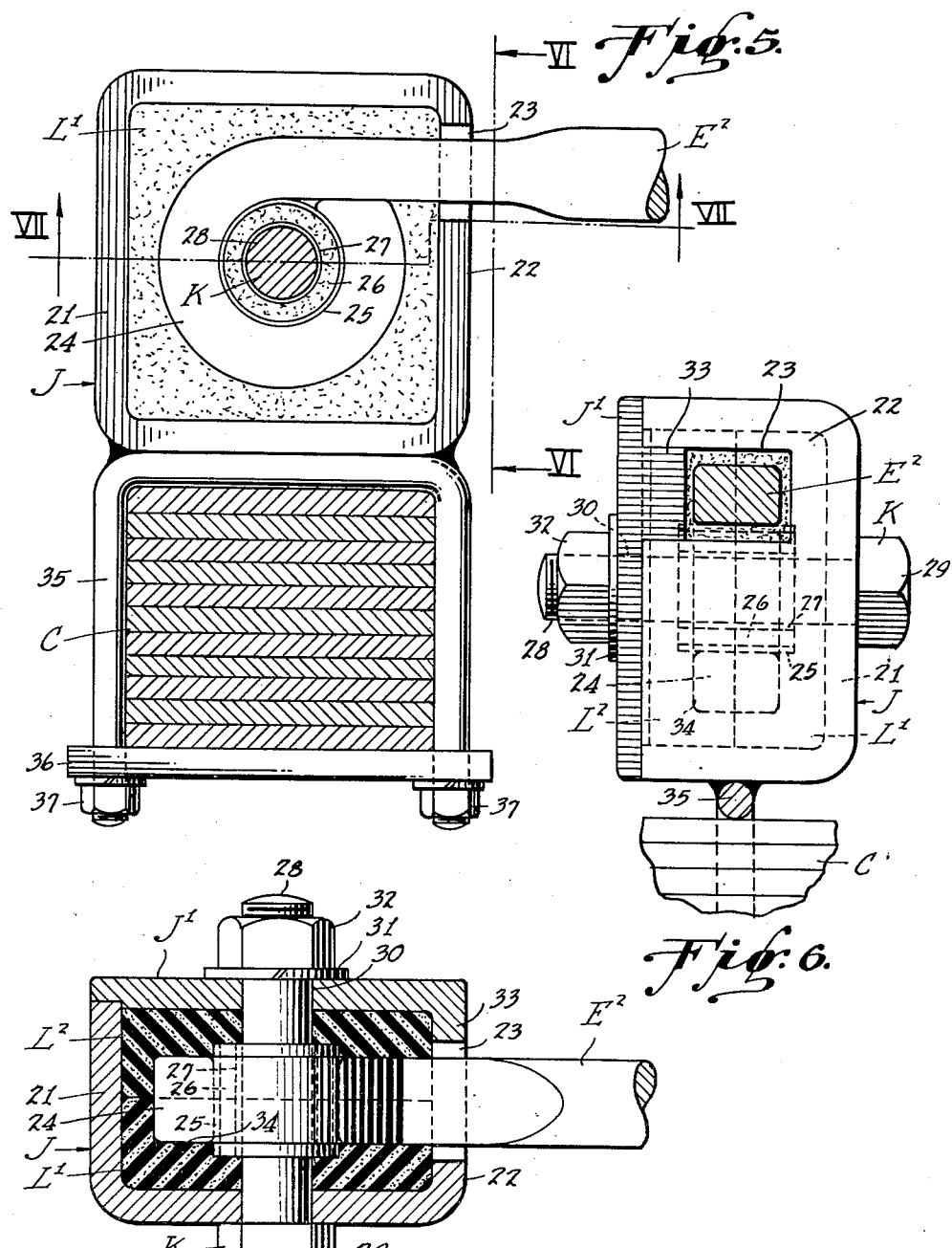
INVENTORS
RALPH TUCK
THOMAS E. HUGHES
ARTHUR U. RIGBY
BY Munn, Liddy & Glaccum
ATTORNEYS Patented May 22, 1951

2,553,689

UNITED STATES PATENT OFFICE 2,553,689

OVERLOADING STABILIZER

Ralph Tuck, Oakland, Thomas E. Hughes, Berkeley, and Arthur U. Rigby, San Leandro, Calif.

Application November 3, 1947, Serial No. 783,658

3 Claims. (Cl. 267—26)

An object of our invention is to provide an overloading stabilizer which differs somewhat in construction from the overloading stabilizer application of Ralph Tuck, filed August 12, 1947, Ser. No. 768,092, now abandoned. In the co-pending application an overloading stabilizer spring is shown with a coiled portion and integral arms extending from the coil which are provided with cylindrical ends. The axis of each cylindrical end extends at right angles to the longitudinal axis of the adjacent arm portion. A hanger is provided for each cylindrical end and receives the end and the adjacent arm portion. Within the hanger two sockets made of rubber receive the cylindrical end and provide a support between this end and the hanger. The hangers in turn are secured to the wheel assembly and to the vehicle body.

In the present case the coiled spring is provided with upper and lower integral arms, the upper arm being provided with a spherical head which is received in a hanger. The lower arm has its end formed into an eye portion through which a bolt is passed for aiding in anchoring the eye in a second hanger, the bolt serving the additional function of securing a cover to the hanger. Novel means is provided for furnishing a resilient connection between the bolt and the eye.

The device is simple in construction and can be readily attached to an automobile or other vehicle. The overloading stabilizer spring aids the vehicle springs in supporting the load and at the same time it tends to function as a snubber and also as a means for preventing any swaying motion between the vehicle body and the supporting wheels.

Other objects and advantages will appear in the following specification, and the novel features of the device will be particularly pointed out in the appended claims.

Our invention is illustrated in the accompanying drawings forming a part of this application, in which:

Figure 1 is a front elevation of the device shown attached to the chassis of a vehicle body and the leaf spring support for the vehicle wheel;

Figure 2 is a front elevation of the upper hanger shown on an enlarged scale;

Figure 3 is a horizontal section taken along the line III—III of Figure 2;

Figure 4 is a transverse section taken along the line IV—IV of Figure 3;

Figure 5 is an enlarged view of the lower hanger with the cover plate removed;

Figure 6 is a transverse section taken along the line VI—VI of Figure 5; and

Figure 7 is a horizontal section taken along the line VII—VII of Figure 6.

While we have shown only the preferred form of our invention, it should be understood that various changes or modifications may be made within the scope of the appended claims without departing from the spirit and scope of the invention.

In carrying out our invention, we make use of a vehicle that has a channel iron A for supporting the vehicle body, not shown, and an axle housing B that is connected to the channel A by a leaf spring C in the usual manner. The spring is secured to the axle housing by U-bolts 1 and the axle housing rotatably supports a vehicle wheel indicated generally at D. The parts thus far described form no part of our invention, except in so far as they cooperate with parts now to be described.

The overloading stabilizer spring has a coiled portion E and upper and lower integral arms E1 and E2, respectively. We will first describe the mounting of the upper arm to the vehicle body, after which we will set forth the mounting of the lower arm to the vehicle wheel assembly.

The upper arm has a spherical head shown at 2 in Figure 3 and this head is integral with the arm. The spherical head and the adjacent portion of the arm are received in an upper hanger, indicated generally at F. The hanger comprises a casing 3 that has an open end 4 that is closed by a cover plate F1. Figures 2 and 3 illustrate the casing as being provided with three lugs 5 arranged in the manner shown and these have threaded openings 6 for receiving cap screws 7. The cover F1 has lugs 8 arranged in the same manner as the lugs 5 and overlying them. The lugs 8 have openings 9 that are aligned with the threaded openings 6 so that the shanks of the screws 7 can be passed through the aligned openings for securing the cover to the casing.

Figure 4 clearly shows the wall 10 of the casing provided with a slot 11 and this slot receives the arm E1. A projection 12 is carried by the cover F1 and extends at right angles to the plane of the cover. This projection extends into the slot 11 for a short distance and cooperates therewith to form an opening through which the upper arm E1 extends.

Within the casing 3 we dispose a rubber socket G1 and this socket has a hemispherical recess 13 for receiving one-half of the spherical head 2. A semicylindrical recess 14 extends from the recess 13 and receives the spring arm E1, while permitting a certain amount of movement between this arm and the wall 10. A second socket made of rubber and indicated at G2 is placed in the interior of the casing 3 and has a hemispherical recess 15 for receiving the other portion of the spherical end 2. A semicylindrical recess 16 extends from the recess 15 and terminates at the inner end of the lug 13, see Figure 3.

The inner and outer rubber sockets G1 and G2 just described are made slightly larger than the compartment in the hanger and are compressed when the cover F1 is secured to the casing. The compression is sufficient to hold the spherical head firmly in the upper hanger F while permitting a certain amount of relative movement between the spring arm E1 and the hanger during the normal use of the device on the vehicle.

The hanger may be secured to the vehicle body in any manner desired and we have shown one of the wheels of the casing 3 welded to an angle member H, the weld being indicated at 17 in Figure 1. The angle member is secured to the channel A in any manner desired, such as by a bolt 18. The horizontal portion of the angle H may be bent back on itself as shown at 19 and a set screw 20 may be used for securing this portion to the channel.

The means for supporting the lower spring arm E2 to the lower hanger J is shown in Figures 5 to 7, inclusive. The lower hanger has a casing 21 with a compartment therein and one wall of the casing indicated by the reference numeral 22 is slotted at 23 for receiving the lower spring arm E2. The lower spring arm has a flattened end portion formed into a cylinder to provide an eye 24. The opening in the eye receives a metal sleeve 25 and this sleeve encloses a rubber sleeve 26. Within the rubber sleeve we mount an inner metal sleeve 27 and the latter receives the shank 28 of a fastening bolt K, see Figure 7. The head 29 of the bolt bears against the outer surface of the casing 21 and the shank passes through an opening in the casing and an aligned opening 30 provided in a cover J1. A lock washer 31 and a nut 32 secure the cover to the casing. Figure 6 illustrates the cover J1 provided with a lug 33 that enters a predetermined distance into the slot 23 provided in the wall 22.

An inner socket of rubber L1 is placed in the casing compartment and has a shaped-recess 34 for receiving the eye 24 and the outer sleeve 25. An outer rubber socket L2 is placed over the portion of the eye 24 that projects beyond the inner socket and both sockets are compressed by the moving of the cover into closed position by the tightening of the bolt.

The lower hanger J may be secured to the wheel assembly in any manner desired. We have shown the hanger welded to a U-bolt 35, see Figure 5, and the U-bolt is attached to the leaf spring C by a strap 36 and nuts 37. The bolt K serves a dual function of holding the cover in closed position while at the same time acting as a central anchor for the eye 24. Any metallic noise between the eye and the bolt shank is prevented by the rubber sleeve 26 and therefore the spring arm E2 may be swung slightly relative to the lower hanger without causing any noise.

It is possible to have both the upper and lower spring arms E1 and E2 provided with the spherical heads 2 or with the eye-shaped ends 24. It is also possible to have the spherical head and the eye-shaped end reversed so far as Figure 1 is concerned. We do not wish to be confined to the spherical head placed only on the upper arm E1 and the eye-shaped portion 24 placed only on the lower arm E2.

From the foregoing description of the various parts of the device, the operation thereof may be readily understood.

The coiled spring E will aid the vehicle spring C in supporting the load of the vehicle body. At the same time the eye 24 will tend to prevent any twisting of the lower arm E2 about the longitudinal axis portion disposed adjacent to the lower hanger. The coil spring E will have a snubbing effect for the vehicle spring C and therefore the vehicle body will move over the ground with less vibration than would otherwise occur. The device also tends to prevent any swaying motion between the vehicle body and the supporting wheels.

We claim:

1. In a device of the type described, a coil spring having an integral arm with an eye formed in the end thereof, a hanger having a slot for receiving the arm and a compartment for receiving the eye, a bolt carried by the hanger and extending through the eye, a rubber sleeve mounted on the bolt and extending through the eye, rubber sockets in the compartment and having recesses for receiving the eye and bolt, and a cover for the hanger and held in place by the bolt.

2. In a device of the type described, a coil spring having an integral arm with an eye formed in the end thereof, a hanger having a slot for receiving the arm and a compartment for receiving the eye, a bolt carried by the hanger and extending through the eye, a rubber sleeve mounted on the bolt and extending through the eye, rubber sockets in the compartment and having recesses for receiving eye and bolt, and a cover for the hanger and held in place by the bolt, said rubber sleeve being lined internally with a metal sleeve that contacts the bolt shank and having an outer metal sleeve that contacts with the inner surface of the eye.

3. In a device of the type described, a coil spring having an integral arm with a spherical head on the free end thereof, means enclosing and supporting said head on the frame of a vehicle, said means comprising a casing having oppositely disposed parallel sides and ends, one of said ends being open, one of said sides being provided with a slot extending from said open end to a point adjacent to the opposite end, said open end and slot receiving the spherical head and arm respectively, rubber sockets in the casing surrounding said head, a cover for the open end of said casing, and means for securing the cover to the casing compressing the rubber sockets about the head.

RALPH TUCK.
THOMAS E. HUGHES.
ARTHUR U. RIGBY.

REFERENCES CITED

The following references are of record in the file of this patent:

UNITED STATES PATENTS

| Number | Name | Date |
|---|---|---|
| 1,976,255 | Hollingsworth | Oct. 9, 1934 |
| 1,980,117 | Turner | Nov. 6, 1934 |
| 2,274,227 | Willard | Feb. 24, 1942 |